Patented Sept. 12, 1950

2,521,911

UNITED STATES PATENT OFFICE 2,521,911

PHENOL-ALDEHYDE AND EPOXIDE RESIN COMPOSITIONS

Sylvan Owen Greenlee, Louisville, Ky., assignor to Devoe & Raynolds Company, Inc., Louisville, Ky., a corporation of New York No Drawing. Application March 8, 1946, Serial No. 653,155

12 Claims. (Cl. 260—43)

This invention relates to new products and compositions resulting from the reaction of phenol aldehyde condensates with complex epoxides in regulated proportions to give valuable compositions for use in the manufacture of varnishes, molding compositions, adhesives, films, molded articles, etc. The complex epoxides used in making the new compositions are themselves derived from the reaction of polyhydric phenols with polyfunctional halohydrins or with polyepoxides in regulated proportions. The invention includes initial reaction mixtures or compositions as well as intermediate and final reaction products or compositions and methods for their production and articles and products made therefrom.

One of the objects of the invention is the production of compositions containing phenol aldehyde condensates and complex epoxides in proportions suitable for reaction by direct addition without the formation of by-products to form resins, films, molding compositions, etc.

Another object of the invention is the production of intermediate reaction products of phenol aldehyde condensates and complex epoxides which are capable of further reaction to form insoluble, infusible products.

Another object of the invention is the production of new products by the reaction of phenol aldehyde condensates with complex epoxides using the complex epoxides in more than the equivalent proportions necessary to react with all of the phenolic hydroxyl groups present in the phenol aldehyde condensate to form compositions containing epoxy groups and alcoholic hydroxyl groups and capable of conversion into infusible products.

Another object of the invention is the production of complex polymeric reaction products of phenol aldehyde condensates and complex epoxides giving products which contain both free phenolic hydroxyl groups and free epoxide groups and capable of forming final infusible and insoluble products.

Another object of the invention is the production of films, articles and molded products and other final reaction products of outstanding properties from such combinations of phenol aldehyde condensates with complex epoxides.

Other objects of the invention will appear from the following more detailed description.

The phenol aldehyde condensates used for reaction with the complex epoxides according to the present invention are products formed by the reaction of phenols and aldehydes, particularly formaldehyde, to form condensation products containing reactive hydroxyl groups. Phenol and formaldehyde, for example, react to form somewhat different reaction products depending upon the proportions and conditions of reaction, and including reaction products such as phenol alcohols having both phenolic and alcoholic hydroxyl groups, and reaction products of the diphenolmethane type containing phenolic hydroxyl groups. In the condensation of phenols and aldehydes, particularly formaldehyde, a variety of intermediate condensation products are produced varying in their properties and nature with different proportions of reagents and different conditions of condensation. The phenol aldehyde resins at an initial or intermediate stage of reaction are included in such phenol aldehyde condensates. The condensation of phenol and formaldehyde can be carried out with the use of either acid or basic condensing agents and in some cases by first combining the aldehyde with a base such as ammonia to form hexamethylenetetramine and reacting it with the phenol to form the phenol aldehyde condensate.

In general, the phenol aldehyde condensates should not have their condensation carried so far that they become insoluble and non-reactive but should be used at an intermediate stage or at a stage of reaction such that they contain reactive phenolic hydroxyl groups or both phenolic and alcoholic hydroxyl groups. Initial and intermediate products such as are made in producing phenol aldehyde resins can be used provided the condensation is carried only to an intermediate stage such that the products can be blended with the polyepoxides and caused to react therewith.

The phenol aldehyde condensates may thus be derived from mononuclear phenols, polynuclear phenols, monohydric phenols or polyhydric phenols so long as the reaction product is miscible with the polyepoxides or so long as they are mutually miscible with the polyepoxides and the solvent which is used as a reaction medium. The phenol aldehyde condensate may be a water soluble type or an alcohol soluble type or an oil soluble type. The phenol aldehyde condensate may also be a heat converting type or it may be a permanently fusible type.

A phenol aldehyde condensate which is essentially a polymethylol phenol and is not a polymer may be used in the preparation of the new phenol aldehyde polyepoxide condensates, or it may be used after further condensation, in which case more or less of the methylol groups are usually considered to have disappeared in the process of condensation.

Various so-called phenolic resins which result from the reaction of phenols and aldehydes, and particularly from common phenols or cresols and formaldehyde, are available as commercial products both of an initial and intermediate character and including resins which are readily soluble in common solvents or readily fusible such that they can be readily admixed with the complex epoxides and react therewith to form the final reaction products.

In my companion application Serial No. 617,176 filed September 18, 1945, I have described complex polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin, to give complex polymeric products containing both terminal epoxy groups and terminal hydroxyl groups and with the epoxy groups in general considerably in excess of the terminal primary hydroxyl groups. Such complex polymeric epoxyhydroxy products and compositions are advantageously used for reaction with phenol aldehyde condensates to give the new epoxy phenol aldehyde condensate compositions and products of the present invention.

In my companion application Serial No. 621,856, filed October 11, 1945, I have described epoxy-hydroxy compositions resulting from the reaction of a polyhydric phenol with a polyfunctional halohydrin such as epichlorhydrin in approximate proportions of 2 mols of epichlorhydrin to 1 mol of dihydric phenol to give resinous products containing both terminal epoxy and hydroxy groups with the proportion of terminal epoxy groups considerably in excess of the terminal hydroxy groups. Such epoxyhydroxy compositions are also advantageously used for reaction with phenol aldehyde condensates to form the new compositions and products of the present invention.

In my companion application Serial No. 626,449, filed November 2, 1945, I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex polymeric polyepoxy reaction products, are advantageously used in reaction with phenol aldehyde condensates to give the new compositions and products of the present invention.

In my companion application Serial No. 653,156, filed March 8, 1946, I have described complex epoxide-containing compositions obtained by the reaction of phenol aldehyde condensates with polyepoxides in proportions to give compositions which contain unreacted epoxide groups as well as unreacted hydroxyl groups. Certain of the low molecular weight or intermediate products of this type as described in said companion application are useful in reactions with certain other phenol aldehyde condensates to give new compositions and products.

The complex epoxides used with the phenol aldehyde condensates contain epoxide groups or epoxide and hydroxyl groups as their functional groups and are free from other functional groups such as basic and acid groups.

The reaction between the phenol aldehyde condensates and the complex epoxides is effected by heating the admixed materials, an elevated temperature usually being required. The use of a small amount of a catalyst such as caustic soda may also promote the reaction.

Both the phenol aldehyde condensate and the complex epoxide may be used at varying initial or intermediate stages of the reaction. Thus initial or intermediate phenol aldehyde condensates and complex epoxides which are soluble in common solvents can be blended in solution in proper proportions and the solution then applied as a coating or for impregnation of fabrics or paper, etc., or for the formation of a film with subsequent heating to remove the solvent and to bring about reaction of the complex epoxide with the phenol aldehyde condensate. A small amount of a catalyst such as caustic soda may be used to promote the reaction. The initial or intermediate phenol aldehyde condensates and the complex epoxides are also advantageously used by admixing them while still fusible with each other and without the use of a solvent, thus giving directly a composite solution which on heating will react and be converted to intermediate or final products without the need of eliminating a volatile solvent.

Thus, for film formation it is desirable to have a varnish which may be applied in the form of thin films without the use of a solvent and, in many cases, without the use of a plasticizer. In such cases a phenol aldehyde condensate is advantageously used which will dissolve in or blend with the complex epoxide to give a liquid composition which is of suitable viscosity for application as a varnish without the use of additional solvents. Such solutions are likewise valuable for the impregnation of wood or the lamination of wood or the impregnation of fabrics. They are also useful in general for molding operations where the presence of a solvent is usually undesirable.

For the preparation of such liquid compositions phenol aldehyde condensates may be advantageously used which are essentially alkylol phenols or phenol alcohols which have not been condensed to any appreciable or considerable extent to give polymers. For various other applications viscous or even solid compositions are desirable in which case partially polymerized or the more or less completely polymerized phenol condensates are advantageously used. In the case of condensates which would convert to infusible, insoluble products, the condensates should be used at an intermediate stage; while condensates which polymerize to a final fusible product can be used in such state of polymerization.

The phenol aldehyde condensates can thus be used in different stages of conversion for admixing with the complex epoxides; and the complex epoxides themselves may be at varying stages of conversion; and products of varying characteristics can be made by the use of admixed products of different stages of conversion, depending upon the application to be made of the final product.

Thus it is sometimes desirable to use a powdered solid fusible material which is capable of becoming infusible on further heating together with a liquid resinous material which is likewise capable of conversion into an infusible material on further heating with or without a catalyst. For such purposes it is possible to use as the powdered solid resin a phenol aldehyde condensate which has been condensed to a solid resin which can be powdered and to use as the liquid resin resins of the complex epoxide type such as are described in my companion application Serial No. 626,449 which when heated with the phenol aldehyde condensate will give a final infusible product. In other cases it is desirable to use one of the complex epoxides as the powdered, fusible, heat-converting resin and a syrupy, liquid phenol aldehyde condensate as the liquid resin. In such cases the liquid resin is usually used in quantities necessary to wet the ingredients and act as a binder in molding the object into a form which is finally heat-converted into an infusible product. Such compositions can advantageously be used as a molding resin composition in the manufacture of grinding wheels or as a heat converting resin in the manufacture of brake linings. When a mixture of such powdered and liquid resins are used in proper proportions and heated in conjunction with inert material such as asbestos, abrasives, etc. a hard, infusible bonded product is produced.

In making the new compositions and products the phenol aldehyde condensates and the complex epoxides may be used with each other in regulated proportions and without the addition of other admixtures. Other admixtures can, however, be made, including filling and compounding materials, plasticizers, pigments, etc. Some of the compositions tend to give final, somewhat brittle products when made without a plasticizer; and plasticizers can advantageously be included in such compositions.

By proper selection of the complex epoxide which is used with the phenol aldehyde condensates it is possible to use phenol aldehyde condensates which would normally give brittle conversion products and would require a high percentage of plasticizer and nevertheless obtain products with suitable flexibility for many uses. Thus such phenol aldehyde condensates may be used with complex epoxides to give products which are unusually tough, hard and flexible provided the proper reaction proportions are used.

The present invention also makes possible the production of infusible products from phenol aldehyde condensates of the type which are permanently fusible such as those derived from the reaction of long chain alkyl substituted phenols with formaldehyde. When such condensates are reacted with the complex epoxides in the presence of a catalyst infusible products can be produced and in many cases flexible, infusible products.

Thus with both phenol aldehyde condensates which would normally give brittle conversion products and phenol aldehyde condensates which are permanently fusible it is possible to produce reaction products with complex epoxides which have suitable flexibility for forming protective coating films without the use of a plasticizer. It may, however, be advantageous to add plasticizers to obtain an increased or modified flexibility or with products which otherwise would be somewhat brittle. Where the reactants would otherwise give a product which is too brittle, the addition of a plasticizer is advantageous.

While I do not desire to limit myself by any theoretical explanation of the exact nature of the reactions which take place between the complex epoxides and the phenol aldehyde condensates, it would appear that this reaction is primarily one of direct addition of an epoxide group to a phenolic group with the resulting formation of an ether linkage, although reaction may also take place between an epoxide group and alcoholic hydroxyl groups present in the resin. Even in phenol aldehyde condensates of a somewhat advanced stage of condensation, hydroxyl groups are apparently present in such form that they are capable of reacting with the complex epoxides. In the case of non-condensed products which are essentially, for example, polymethylol phenol, there is present a high percentage of both alcoholic hydroxyl groups and phenolic hydroxyl groups, in which case both of these types of hydroxyl groups may react with the complex epoxides.

It may be also that other condensations take place by interaction of the phenol aldehyde with itself, and that the presence of the complex epoxides does not prevent such condensations to some extent. It may be, however, that such normal condensations of phenol aldehyde condensate are greatly reduced, if not completely eliminated, by the reaction between complex epoxide and the condensate. It seems probable, however, that the conversion to the final polymeric product by reaction between the complex epoxides and the phenol aldehyde condensates is accompanied by some normal phenol aldehyde condensation and that the simultaneous reaction of complex epoxides with alcoholic and phenolic hydroxyl groups and the normal condensation of phenol aldehyde condensates with themselves takes place to some extent simultaneously in forming the complex final products.

The reactivity of complex epoxides with phenol aldehyde condensates is somewhat dependent upon the type and structure of phenol aldehyde condensates used. It is usually advantageous to use a catalyst to complete conversions; however, in many cases it is possible to produce insoluble, infusible products without the use of a catalyst. Catalysts which have been found particularly advantageous are alkaline catalysts such as aliphatic amines, sodium and potassium hydroxides and alkali phenoxides. Certain Friedel-Crafts type catalysts, especially boron trifluoride have been found to be extremely reactive as catalysts in promoting reaction or polymerization of the phenol aldehyde condensate epoxide compositions to form high polymers.

The final conversion may be carried out with or without use of solvents and with or without the use of plasticizers depending upon the final results desired. In certain protective coating applications it is sometimes desirable to apply a product which is essentially a solid dissolved in a solvent in which case it undergoes a preliminary dry by mere solvent evaporation, and the dry film may then be converted to an infusible, insoluble product on further heat treatment. On the other hand when the polymerization products of the present invention are used to make molded or impregnated articles it is usually desirable to use a composition which contains no solvent and which is sufficiently liquid at the temperature to be used in the final conversion such that it can be used without a solvent.

The present invention makes possible the production of final infusible products of acceptable flexibility without the use of plasticizers or with a reduced amount of plasticizer, provided suitable proportions of the complex epoxides are used with the phenol aldehyde condensates.

For many purposes the initial mixture of phenol aldehyde condensate and complex epoxide can be used as a liquid mixture or in solution and, after application, converted to the final product in a single operation.

For other purposes it is advantageous to carry out the reaction of the phenol aldehyde condensate and complex epoxide part way to an intermediate stage of reaction, such that it is capable of further reaction to form the final product; and to use the intermediate product e. g. in solution for making films or for coating or impregnation or by compounding the intermediate product with fillers, etc. to make molded products.

It will be understood that the compositions of the present invention may be blended with other film forming or molded object forming compositions. The new compositions may also be pigmented or otherwise ground with certain inert fillers as desired for special applications.

The present invention provides a wide range of reaction compositions and products including initial mixtures of phenol aldehyde condensates and complex epoxides, partial or intermediate reaction products of such initial mixtures, and compositions containing such intermediate reaction products as well as final reaction products. Such compositions containing unreacted epoxide groups may be reacted with still other crosslinking reagents which contain at least two active hydrogen groups which are capable of reaction with an epoxide group to give more complex products. Compositions of the present invention, in general, contain a large number of hydroxyl groups and may be further reacted with coupling agents which are capable of reacting with these free hydroxyl groups to give more complex products.

In general, the intermediate reaction products, as well as the initial mixtures, unless too highly polymerized, are soluble in solvents of the lacquer type such as ketone and ester solvents. Certain of the resinous reaction products of lower melting point and lower degree of polymerization are soluble in hydrocarbon solvents, particularly the aromatic type.

In addition to having outstanding physical properties such as toughness and flexibility, the final conversion products derived from the new compositions have outstanding chemical properties. Such products are highly resistant to oxidation, water, alkali, acids, solvents, etc.

Films and objects made from the new compositions may also be relatively free from yellowing apparently due to the fact that little or no aliphatic double bonds are present and, also, due to the fact that the phenolic hydroxyl groups which are usually considered to give yellowing in phenol aldehyde condensates have been converted to the ether groups through reaction with epoxide groups. The fact that these phenolic hydroxyl groups have been converted to ether groups removes the possibility of a shift of the phenolic hydroxyl group into a ketone form which is usually credited with the formation of color on ageing of the normal phenol formaldehyde type of product.

It has also been observed that films prepared from the new compositions have an unusually high adhesion for surfaces. This is especially desirable in such applications as protective coating films and even with certain molded objects, such as the mold used to cement the bristle of an ordinary paint brush into the metal ferrule. In the latter case it is desirable that the resin used have a very high adhesion to the metal. This unusual adhesion to surfaces is apparently due to the fact that the compositions contain a high percentage of unreacted alcoholic hydroxyl groups even in the final converted infusible stage. It is also known that ether groups exert an appreciable polar attraction to surfaces and it is also possible that the ether groups present in the new compositions are partially responsible for the unusual adhesion to surfaces. Even though the new compositions of the present invention do contain a high percentage of hydroxyl groups and ether groups in the final converted products, the tolerance for water is unusually low, apparently due to the high molecular weight and rigid structure of the final material.

The invention will be further illustrated by the following specific examples but it will be understood that the invention is not limited thereto.

The first seven examples do not relate to the new compositions but describe phenol formaldehyde condensates (Examples I and II) and the preparation of a number of complex epoxides (Examples III to VII) suitable for use in making the new compositions. Examples VIII to XVII illustrate the new compositions and products made with phenol aldehyde condensates and complex epoxides.

*Example I.*—A water soluble phenol aldehyde condensate was prepared by heating a mixture of 278 parts of formalin (40% formaldehyde), 188 parts of phenol and 3.2 parts of sodium hydroxide for 45 minutes at refluxing temperature. The final product contains sufficient water to give 61 percent solids.

*Example II.*—A water insoluble phenol aldehyde condensate was prepared by refluxing 94 parts of phenol with 203 parts of formaline and 1.5 parts of potassium hydroxide for a period of one hour and 38 minutes. The water layer was removed by decantation.

*Example III.*—A complex epoxide condensate was prepared by the reaction of 1 mol of bisphenol with 2 mols of epichlorhydrin in the presence of 2.24 mols of sodium hydroxide to give a product softening at 43° C. and an equivalent weight to epoxide group of 325.

The epoxide content of the complex epoxides herein discussed were determined by heating a 1 gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering that 1 HCl is equal to 1 epoxide group.

The melting points of resins as herein discussed were determined by Durran's mercury method.

*Example IV.*—A complex epoxide was prepared by treating 3 mols of bisphenol with 4 mols of epichlorhydrin in the presence of 5.2 mols of sodium hydroxide giving a product which melted at 90° C. and contained an equivalent to epoxide group of 730.

*Example V.*—A complex epoxide was prepared by heating 100 parts of the product of Example IV with 6 parts of bisphenol, taking 1 hour to go from 150 to 200° C. and holding at 200° C. for 1½ hrs. This product melted at 130° C. and contained an epoxide equivalent of 1300.

*Example VI.*—A complex epoxide was prepared by heating 100 parts of the product of Example IV with 14.3 parts of bisphenol for 2 hours at 200° C. This product melted at 146° C. and had an epoxide equivalent of 3100.

*Example VII.*—A complex epoxide was prepared from 6 mols of resorcinol and 7 mols of epichlorhydrin with 7.5 mols of aqueous sodium hydroxide and having a melting point of 80° C. and an equivalent weight to epoxide of 1100.

*Example VIII.*—Equal parts of the phenol aldehyde condensate of Example I and the complex epoxide of Example IV were treated with 2% on the total weight of sodium phenoxide and the resulting mixture was heated for one hour at 150° C. to give an infusible product.

*Example IX.*—Ten parts of the product of Example I and 20 parts of the product of Example III were treated with 1 part of diethylene triamine and the product was baked for one-half hour at 150° C. to give an infusible product.

*Example X.*—A mixture of 10 parts of the product of Example II and 20 parts of the product of Example III was treated with one part of diethylene triamine and the resulting mixture was heated in a molding form for one hour at 150° C. to give an infusible product.

*Example XI.*—A mixture of 10 parts of the product of Example II, 20 parts of the product of Example VI and 1 part of monopotassium bisphenoxide was heated in a molding form for one-half hour at 150° C. to give an infusible product.

*Example XII.*—A mixture of 10 parts of the product of Example II, 20 parts of the product of Example III and 3 parts of sodium hydroxide was heated in a molding form for one-half hour at 150° C. to give an infusible product.

*Example XIII.*—A mixture of 10 parts of a soluble, fusible phenyl phenol formaldehyde resin, 10 parts of the product of Example III and 2 parts of sodium phenoxide was dissolved in methyl ethyl ketone to give 50% solids. Wet films of .003 inch thickness baked for 30 minutes at 150° C. gave hard, infusible, flexible products.

*Example XIV.*—A 50% solution of a mixture of 10 parts of a soluble, fusible phenol formaldehyde resin, 10 parts of the product of Example IV and 1 part of sodium phenoxide dissolved in methyl ethyl ketone gave a varnish which when spread in films of .003 inch thickness and baked for 30 minutes at 150° C. gave hard, infusible products.

*Example XV.*—A mixture of 100 parts of the product of Example I, 61 parts of the product of Example VI and 3.2 parts of sodium hydroxide was dissolved in methyl ethyl ketone to give 50% solids. Wet films of .003 inch thickness when baked for 1 hour at 125° C. gave hard, flexible products.

*Example XVI.*—A mixture of 100 parts of the product of Example VII and 61 parts of the product of Example I treated with 2 parts of potassium hydroxide was dissolved in methyl ethyl ketone to give a varnish of 50% solids. Wet films of .003 inch thickness when baked for 30 minutes at 150° C. gave hard, infusible products.

*Example XVII.*—A 50% solution of a mixture of 100 parts of the product of Example V, 30 parts of a soluble, fusible phenol formaldehyde resin and 2 parts of potassium hydroxide in methyl ethyl ketone gave a varnish which when spread in thin films and baked for 15 minutes at 200° C. gave an infusible, flexible product.

The proportions of phenol-aldehyde resin and of epoxide resin in the above examples vary from a large excess of epoxide resin, as in Example XVII, where the amount of epoxide resin is about 3⅓ times the amount of phenol-aldehyde resin, to about equal amounts, as in Examples XIII to XV.

It will thus be seen that the present invention provides improved resinous and plastic compositions and products in which phenol aldehyde condensates are admixed with complex epoxides to form initial compositions capable of conversion into intermediate or into final reaction or polymerization products.

It will also be seen that the initial composition made up of complex epoxide and phenol aldehyde condensate may be used directly in making liquid coating compositions or in making molded articles, etc. with subsequent conversion by heating into the final reaction product. It will further be seen that the intermediate reaction products from the phenol aldehyde and polyepoxide resins can be produced which are soluble and fusible and which are capable of further reaction to form final infusible products.

Products and compositions of varying products can be produced by using varying proportions of the phenol aldehyde resin and of the complex epoxide resin as well as by using respective resins of somewhat different properties. With high melting phenolic resins and polyepoxide resins a limited amount of reaction may be sufficient to convert the mixed resins into a final infusible product. With phenol resins of an intermediate stage of condensation and with complex epoxides also of an intermediate character the reaction can be carried out in stages to form intermediate plastic compositions which can be subsequently converted into final products.

The new compositions are capable of admixture with various other resins in forming the final molding mixtures and can also be used for compounding with fillers in making molded articles or for impregnating paper, fabric, wood, etc. in making impregnated or coated articles.

It will also be seen that the reaction between epoxide groups of the complex epoxide and hydroxyl groups of the phenol aldehyde condensate or resin is one of direct addition of epoxide to hydroxyl and does not give off any byproducts, but results in joining the reactants together through ether linkages. Other reactions may, however, take place, particularly where the phenolic resin can react with itself as well as with the complex epoxides in forming the final reaction products.

I claim:

1. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups.

2. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups and also containing a substantial percentage of an alkaline catalyst.

3. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups and also containing a substantial percentage of an aliphatic polyamine catalyst.

4. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups, said composition being in the form of a solution in a common organic solvent of the phenol-aldehyde condensate and of the complex epoxide.

5. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups, the proportions of phenol-aldehyde condensate and complex epoxide being within the range of $3\frac{1}{3}$ parts by weight of complex epoxide to one of phenol-aldehyde condensate and about equal parts of phenol-aldehyde condensate and of complex epoxide.

6. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups, the proportions of phenol-aldehyde condensate and complex epoxide being within the range of $3\frac{1}{3}$ parts by weight of complex epoxide to one of phenol-aldehyde condensate and about equal parts of phenol-aldehyde condensate and of complex epoxide and also containing a substantial percentage of an alkaline catalyst.

7. Phenol-aldehyde and epoxy resin compositions containing in substantial proportions a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups, the proportions of phenol-aldehyde condensate and complex epoxide being within the range of $3\frac{1}{3}$ parts by weight of complex epoxide to one of phenol-aldehyde condensate and about equal parts of phenol-aldehyde condensate and of complex epoxide and also containing a substantial percentage of an aliphatic polyamine catalyst.

8. An intermediate reaction product resulting from the partial reaction of the composition of claim 2 containing direct addition-reaction products of the complex epoxide and the phenol-aldehyde condensate.

9. An intermediate reaction product resulting from the partial reaction of the composition of claim 6 containing direct addition-reaction products of the complex epoxide and the phenol-aldehyde condensate.

10. Infusible articles and compositions containing infusible reaction products of the composition of claim 2.

11. Infusible articles and compositions containing infusible reaction products of the composition of claim 6.

12. The method of forming plastic compositions which comprises heating with a substantial amount of an alkaline catalyst, a mixture containing substantial proportions of a phenol-aldehyde condensate containing reactive hydroxyl groups and a complex, normally solid epoxide resin which is a polyether derivative of a polyhydric phenol containing epoxy groups and free from functional groups other than epoxy and hydroxyl groups.

SYLVAN OWEN GREENLEE.

REFERENCES CITED

The following references are of record in the file of this patent:

UNITED STATES PATENTS

| Number | Name | Date |
|---|---|---|
| 1,952,243 | Frick | Mar. 27, 1934 |

FOREIGN PATENTS

| Number | Country | Date |
|---|---|---|
| 576,177 | Germany | May 8, 1933 |